Patented Aug. 31, 1937

2,091,878

UNITED STATES PATENT OFFICE

2,091,878

STABILIZED CHLORINE-CONTAINING RUBBER COMPOUNDS AND METHOD OF PRODUCING

John M. Peterson, Kennett Square, Pa., assignor to Hercules Powder Company, Wilmington, Del., a corporation of Delaware No Drawing. Application June 25, 1935, Serial No. 28,305

6 Claims. (Cl. 106—23)

This invention relates to stabilized chlorine-containing compounds of rubber, by which is meant and included chlorinated rubber, rubber hydrochloride, chlorinated rubber hydrochloride, etc., and to methods for the production of such materials.

As is well known, chlorine-containing rubber compounds, as chlorinated rubber, rubber hydrochloride, chlorinated rubber hydrochloride, etc., are produced by treatment of vulcanized, unvulcanized, or reclaimed rubber, latex, gutta percha, balata, and the like with chlorine, hydrogen chloride, or with hydrogen chloride and then chlorine, or by alternate treatments in any order, and will contain widely varying amounts of chlorine as a result of the reaction of the rubber with chlorine and/or hydrogen chloride.

These chlorine-containing rubber compounds are characterized, however, depending upon their chlorine content, the particular method utilized in their production, etc., by a greater or less degree of chemical instability, which ordinarily manifests itself in a more or less gradual decomposition with the evolution of hydrogen chloride. This decomposition and evolution of hydrogen chloride is particularly marked at elevated temperatures or upon exposure to ultra-violet light.

It has been proposed to stabilize chlorine-containing compounds of rubber and prevent or minimize any decomposition by the addition of various antacid or basic materials. This method of stabilization, however, introduces contaminating materials into the product, and often renders the product more or less unsuitable for various uses to which it would otherwise be adapted.

Now in accordance with this invention it has been found, surprisingly, that chlorine-containing rubber compounds may be stabilized and their tendency to decompose greatly diminished by being subjected to a heat treatment, without the use of any antacid or basic material.

The method of stabilization in accordance with this invention will accordingly comprise subjecting the chlorine-containing rubber compound, as chlorinated rubber, rubber hydrochloride, chlorinated rubber hydrochloride, etc., either alone or in solution in a suitable solvent, as, for example, carbon tetrachloride, benzene, xylene, monochlorobenzene, etc., but without the use of any antacid or basic material, to a heat treatment.

The temperature of heat treatment will vary from about 75° C. to just below the temperature of rapid decomposition, depending upon the chlorine content and the method of preparation of the compound being heat treated. Thus, for rubber hydrochloride, a suitable temperature is about 75° C. Compounds containing more than about 50% chlorine may be heated at temperatures from about 100° C. to just below the temperature of rapid decomposition, which is approximately 160° C., and preferably within the range of about 115° C. to about 140° C. The duration of the heat treatment to effect satisfactory stabilization will, of course, depend upon the particular temperature selected and will vary from only a few minutes to several hours. Thus, for stabilizing a chlorine-containing rubber compound of about 65% chlorine content, heat treatment at a temperature of 150° C. for ten minutes will usually be satisfactory; at 135° C., one hour; at 125° C., ninety minutes; and at 100° C., eight hours. It will be seen accordingly that a wide range of temperatures and times may be chosen for the heat treatment in accordance with this invention. A combination of high temperature and long time of treatment will, however, desirably be avoided, since it will tend to darken or discolor the product.

The heat treatment in accordance with this invention may be given to the chlorine-containing rubber compound in any suitably heated vessel. Preferably, when the chlorine-containing compound is in solid form, the vessel will be designed to insure agitation of the material and thorough and even distribution of heat throughout the mass. It may be desirable to apply vacuum to the vessel during the heat treatment to aid in the removal of any decomposition products, and/or to pass a slow stream of gas, preferably an inert gas, as nitrogen, etc., through the vessel.

Where heat treatment is applied to a solution of a chlorine-containing rubber compound, it will desirably be to the original solution resulting from the usual processes used in the production of the material. However, the chlorine-containing rubber compound may be dissolved in any suitable solvent, as, for example, carbon tetrachloride, benzene, xylene, monochlorobenzene, etc., and the solution heat treated in accordance with this invention. Heat treating of a solution of a chlorine-containing rubber compound may be effected in a suitably heated vessel, or may be carried out in a continuous manner by passing the solution at any desired rate through a suitably heated pipe or coil. It will often be desirable to carry out the heat treatment of a solution at superatmospheric pressure in order to obtain a desired temperature above the normal boiling point of the solvent.

The heat treatment in accordance with this invention may also be advantageously carried out in conjunction with various steps in working up the finished chlorine-containing rubber compound from the crude reaction mixture obtained in its production. Thus, where the solvent is removed from the reaction mixture by treatment with hot water or steam, the heat treatment in accordance with this invention may be combined with the usual drying operation by proceeding at a sufficiently high temperature, and for a sufficient duration of time. The presence of water in the mass of the chlorine derivative of rubber will, under atmospheric pressure, restrict the temperature to about 100° C. until all the water has been removed, after which the temperature may be raised to any desired point. However, if it is desirable to heat treat the chlorine-containing rubber derivative without removing the water, it will be necessary to do so under superatmospheric pressure, if a temperature over 100° C. is to be used.

The heat treated chlorine-containing rubber compound in accordance with this invention will be substantially similar in its physical and chemical properties to the untreated product, and accordingly may be used in any manner and for any purpose that the untreated chlorine-containing rubber compound may be used. The heat treated product, however, will be differentiated from the untreated material by its greatly increased stability, and will be differentiated from all other stabilized chlorine-containing rubber compounds by the fact that it contains no added antacids or basic materials.

Examples of the increase in the stability of chlorine-containing compounds of rubber produced by heat treatment in accordance with the method of this invention are shown in the table which follows. The stability data given in this table were obtained by a test which consisted in heating a one gram sample of the chlorine-containing compound of rubber in a 6" x ½" test tube, with a piece of Congo red test paper ½" x ½" suspended by a wire so that the lower edge is 4½" from the surface of the sample. The wire is held by a cork which loosely closes the test tube. The test tube is then placed in a bath at 100° C. and the temperature raised steadily at the rate of 1° C. per minute. The temperature at which the lower edge of the Congo red paper changes from red to blue is recorded as a measure of the stability of the sample under test.

Table

|  | Stability before treatment (max. temp.) | Stabilization treatment | Stability after treatment (max. temp.) |
| --- | --- | --- | --- |
| *Chlorinated rubber* | | | |
| 66% $Cl_2$ | 110° C | 135° C. for 1 hr | 136° C. |
| 66% $Cl_2$ | 110° C | 150° C. for 10 min | 137° C. |
| 66% $Cl_2$ | 110° C | 125° C. for 90 min | 139° C. |
| 66% $Cl_2$ | 110° C | 100° C. for 8 hrs | 135° C. |
| 68.6% $Cl_2$ | 102° C | 125° C. for 4 hrs. in xylene. | 143° C. |
| *Rubber hydrochloride* | | | |
| 30.0% $Cl_2$ | 82° C | 125° C. for 1 hr | 97.5° C. |
| 30.0% $Cl_2$ | 82° C | 100° C. for 1 hr | 87.5° C. |
| 30.0% $Cl_2$ | 82° C | 75° C. for 6 hrs | 89.0° C. |
| 31.3% $Cl_2$ | 88° C | 75° C. for 72 hrs | 106.0° C. |
| 30.3% $Cl_2$ | 82° C | 125° C. for 6 hrs. in xylene. | 96.5° C. |
| *Chlorinated rubber hydrochloride* | | | |
| 35.3% $Cl_2$ | 101.5° C | 100° C. for 8 hrs | 110.0° C. |
| 45.7% $Cl_2$ | 82.0° C | 75° C. for 6 hrs | 90.0° C. |
| 45.7% $Cl_2$ | 82.0° C | 100° C. for 1 hr | 86.5° C. |
| 45.7% $Cl_2$ | 82.0° C | 125° C. for 1 hr | 97.0° C. |
| 45.8% $Cl_2$ | 104.0° C | 75° C. for 8 hrs | 129.0° C. |
| 59.8% $Cl_2$ | 102.0° C | 100° C. for 8 hrs | 120.0° C. |
| 59.8% $Cl_2$ | 102.0° C | 125° C. for 4 hrs | 122.0° C. |

It will be noted that the test used to obtain the stability data shown in this table was very drastic, and it will be appreciated that an increase of only a few degrees in the maximum temperature to which the sample can be heated without evolution of hydrogen chloride indicates a very great increase in stability under normal temperature conditions.

It will be understood that where in the claims hereinafter set forth the term chlorine-containing rubber compound is used such is intended to include chlorinated rubber, rubber hydrochloride and chlorinated rubber hydrochloride, and that chlorine-containing compounds of gutta percha, balata, and the like, are contemplated as equivalents for chlorine-containing rubber compounds.

It will be further understood that the details and examples hereinbefore set forth are illustrative only, and are in no way in limitation of the invention herein described and claimed.

What I claim and desire to protect by Letters Patent is:

1. The method of stabilizing a chlorine-containing rubber compound selected from the group consisting of chlorinated rubber, rubber hydrochloride and chlorinated rubber hydrochloride, which comprises heating said chlorine-containing rubber compound, in the absence of any basic material in quantity sufficient to possess any substantial stabilizing effect, to a temperature of from about 100° C. to just below a temperature at which substantial decomposition of the said compound will take place for a period of time sufficient to produce substantial stability, said period of time ranging from about ten minutes, at the highest temperatures employed, to about eight hours at 100° C.

2. The method of stabilizing a chlorine-containing rubber compound selected from the group consisting of chlorinated rubber, rubber hydrochloride and chlorinated rubber hydrochloride, which comprises heating said chlorine-containing rubber compound, in the absence of any basic material in quantity sufficient to possess any substantial stabilizing effect, to a temperature of from about 100° C. to about 150° C. for a period of time ranging from about ten minutes, at 150° C., to about eight hours at 100° C.

3. The method of stabilizing a chlorine-containing rubber compound selected from the group consisting of chlorinated rubber, rubber hydrochloride and chlorinated rubber hydrochloride, which comprises heating said chlorine-containing rubber compound, in the absence of any basic material in quantity sufficient to possess any substantial stabilizing effect, to a temperature of from about 115° C. to about 140° C. for a period of time sufficient to produce substantial stability.

4. The method of stabilizing chlorinated rubber which comprises heating chlorinated rubber, in the absence of any basic material in quantity sufficient to possess any substantial stabilizing effect, to a temperature of from about 100° C. to just below a temperature at which substantial decomposition of the chlorinated rubber will take place for a period of time sufficient to produce substantial stability, said period of time ranging from about ten minutes, at the highest temperatures employed, to about eight hours at 100° C.

5. The method of stabilizing chlorinated rubber which comprises heating chlorinated rubber, in the absence of any basic material in quantity sufficient to possess any substantial stabilizing effect, to a temperature of from about 100° C. to about 150° C. for a period of time ranging from about ten minutes, at 150° C., to about eight hours at 100° C.

6. The method of stabilizing chlorinated rubber which comprises heating chlorinated rubber, in the absence of any basic material in quantity sufficient to possess any substantial stabilizing effect, to a temperature of from about 115° C. to about 140° C. for a period of time sufficient to produce substantial stability.

JOHN M. PETERSON.